Patented June 5, 1951

2,555,745

UNITED STATES PATENT OFFICE 2,555,745

ADHESIVE TAPES AND SHEETS

James E. A. Hopkins, Carl E. Frick, and Paul Van Cleef, Chicago, Ill., assignors to Van Cleef Bros. Inc., Chicago, Ill., a corporation of Illinois No Drawing. Application July 27, 1948, Serial No. 40,994

4 Claims. (Cl. 117—138.8)

The present invention relates to improvements in pressure-sensitive adhesive tapes and sheets and in bonding materials for use in connection therewith.

In preparing pressure-sensitive adhesive tapes and sheets, particular difficulties have arisen in the application of bonding of the pressure-sensitive adhesive to backing tapes or films formed of vinyl resins, i. e., polymers of vinyl derivatives, because of the non-adherent character of such resins. Such non-adherent or resistant backing tapes or sheets are, for example, those formed from polyvinyl chloride; polyvinyl butyral, and the like; copolymers of vinyl chloride and vinyl acetate, such as those containing 85 to 95% of vinyl chloride: for example, the commercial products "Vinylite" and the "Geon" 100 series, and other suitable copolymers of vinyl chloride and vinyl esters. In accordance with the present invention a bonding material is produced which, when applied to sheets or tapes formed from such vinyl resins, is strongly adherent thereto and serves as a bond or base for the application of a pressure-sensitive adhesive. The resulting tape or sheet is then adapted for use in the usual manner, as the adhesive will be well bonded to the vinyl resin backing through the bonding coat. The product may be rolled upon itself without difficulty, since the pressure-sensitive adhesive is not adherent to the vinyl resin film forming the backing.

The bonding material of the present invention, while particularly adapted for bonding the pressure-sensitive adhesive to normally non-adhesive vinyl resin films, may also be employed to bond such adhesives to films of other materials, such as films of rubber hydrochloride, cellophane, ethyl cellulose, cellulose acetate and the like.

In preparing the bonding coat in accordance with the present invention, we employ an unvulcanized rubber plastic of the diene polymer type, which may be either natural or a synthetic rubber, together with a minor proportion of the compound methylene-bis-(4-phenyl-isocyanate), having the chemical formula

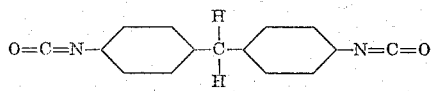

This material may be used as such, but it is preferably employed in the form of a 50% solution or dispersion in orthodichlorobenzene, which is readily available commercially. The high boiling solvent used in this commercial solution has no deleterious effects in forming the bonding material, as hereinafter set forth.

The rubber plastic employed in preparing the bonding material in accordance with the present invention may suitably be natural rubber, for example in the form of pale crepe or of smoked sheets, or may be a synthetic rubber plastic. Those synthetic rubber plastics which may be employed are, for example, the polymerized diene elastomers, such as the sodium catalyzed butadiene and methylbutadiene polymers, the butadiene-acrylonitrile copolymers, such as "Perbunan," "Hycar OR," "Butaprene," "Chemigum" and "GRA"; the butadiene-styrene copolymers such as those commercially known as "Buna S," "GR-S," "Hycar OS" and the like, or the chloroprene polymer such as that commercially known as "neoprene."

In preparing the bonding material the rubber plastic is first thoroughly plasticized or broken down. This is effected suitably by prolonged milling on a hot rubber mill and if desired, a small amount of a plasticizing chemical may be added to facilitate the plasticizing of the rubber. A suitable plasticizer is naphthyl-beta-mercaptan, which is obtainable commercially in a form consisting of one third of this compound and two thirds of an inert hydrocarbon, under the name "RPA No. 2." Other suitable plasticizers may be employed, such as dodecyl mercaptan or xylyl mercaptan. One fourth to one part by weight of this plasticizer may be added to each 100 parts by weight of the natural or synthetic rubber plastic on the milling rolls. Other plasticizers may be used or the rubber plastic may be milled until thoroughly plasticized or broken down in the absence of the plasticizer. The milling time may be in the order of thirty minutes or longer on hot milling rolls in accordance with the usual practice.

The plasticized rubber is then dissolved in a suitable volatile solvent such as benzol, toluol or the like. The proportion of the solvent may be varied to give a smooth-working solution and may be, for example, from 7 to 10 parts by weight for each part by weight of rubber. Just prior to use, a minor proportion of the aforesaid isocyanate compound, preferably in solution or dispersion in orthodichlorobenzene or other suitable high boiling solvent, is added to the rubber solution. This addition is made only shortly before use of the composition since the latter has a tendency to gel in a comparatively short period of time.

The isocyanate compound is added in proportions of 10 to 30 pounds to each 100 pounds of the rubber plastic employed. Preferably about 20 pounds of the isocyanate compound is added to each 100 pounds of the rubber plastic. In using the available commercial solution containing 50% of the isocyanate compound in orthodichlorobenzene, in order to secure the necessary proportion of the isocyanate compound, twice the amount of the solution must be employed.

A typical example of a bonding composition for use in accordance with the present invention is as follows (all parts being parts by weight):

100 parts rubber, such as smoked rubber sheet
½ part plasticizer, as RPA No. 2
900 parts toluol
40 parts 50% dispersion of methylene-bis-(4-phenyl isocyanate) in orthodichlorobenzene In the above formula, pale crepe rubber sheet may be used instead of the smoked sheet. Synthetic rubbers of the polymerized diene elastomer type may likewise be used instead of the natural rubber, for example, the butadiene-styrene copolymer elastomers, such as "Buna S" and "GR-S"; the butadiene-acrylonitrile elastomers such as Hycar OR and GRA, and the chloroprene polymer elastomers such as neoprene. Also, other solvents may be used. In the case of "Hycar OR," for example, a suitable solvent is a nitroparaffin such as 1-nitropropane. Other plasticizers, such as dodecyl or xylyl mercaptan may be used instead of naphthyl mercaptan or the plasticizer may be omitted, as noted above.

The resulting solution containing the methylene-bis-(4-phenyl isocyanate), promptly after its preparation, is applied to the film forming the backing in any suitable manner to form a thin coating, for example, by means of an ordinary rubber spreader. This film may suitably be a vinyl resin film formed of a copolymer of vinyl chloride and vinyl acetate. Other vinyl resin films, such as films formed from polyvinyl chloride, polyvinyl butyral or the like may also be employed.

Immediately following the application of the solution, the film may be led into and through a drying chamber where it is heated to remove the solvent and also to bring about a bonding reaction in which the methylene-bis-(4-phenyl isocyanate) apparently reacts with the rubber and with the film on which it is deposited. In the drying chamber, the coated film may be retained at a temperature in the range from about 200° to about 250° F. for a period sufficient to remove the toluene or other solvent and secure the desired bonding reaction, suitably 20 to 30 minutes or longer. It is preferred that, after the bonding coating has been applied as above set forth, the coated film be rolled on itself, suitably on a steel mandrel (which may be solid or hollow), using a paper or Holland cloth liner, and the roll then heated within the range of temperatures above set forth. For example, it may be heated to 200° to 210° F. for about 2 hours. Somewhat higher temperatures than 250° F. may be employed, with corresponding reduction in time, or somewhat lower temperatures than 200° C. may be employed, with a corresponding increase but in general it is preferred to operate in the range of temperatures from 200° to 250° F.

Following this operation, it is found that the bonding coat is securely adherent to the vinyl resin film and does not rub or roll off. The pressure-sensitive adhesive may then be applied to the bonding coat and will firmly adhere thereto.

The pressure-sensitive adhesive employed may be any of the customary adhesives of this character prepared from rubber and resins or resinlike material, such as coumarone-indene resin, rosin, hydrogenated rosin acid esters, or mixtures thereof, with or without pigment material such as zinc oxide, carbon black and the like, as desired. Suitable compositions of this character may contain, for example, 30 to 80% of natural or of synthetic rubber, for example, of the polymerized diene elastomer type, and 20 to 70% of resinous material such as rosin, hydrogenated rosin, hydrogenated rosin acid esters, coumarone-indene resins and the like. A formula which has been found satisfactory is prepared by admixing the following (all parts by weight):

100 parts smoked rubber sheet
4 parts hydrogenated methyl abietate (Hercolyn)
50 parts burgundy pitch
30 parts zinc oxide
10 parts carbon black This adhesive composition may be thinned with a solvent, such as benzol, toluol or petroleum naphtha, if necessary, to facilitate spreading and coating.

The adhesive, after preparation, may be applied in the usual manner over the bonding coat and dried by passing through an oven, suitably at a temperature of about 150° F.

If desired, after the bonding coat solution is applied to the backing, it may be heated or dried by passage through a drying chamber at a suitable temperature of say, 180° to 250° F., to remove the solvent, and the coating of the pressure-sensitive adhesive may then be applied to the bonding coat and the solvent, if any be present, removed by heating. The coated tape may then be rolled on a solid or hollow steel core and heated to a temperature in the range of 200° to 250° F., say to 200° to 210° F. for about 2 hours to effect the bonding reaction between the backing film and the bonding coat, bonding the adhesive to said backing.

The coated films, prepared as hereinbefore described, are slit into various widths, as desired, and wound into rolls. The adhesive does not adhere or transfer to the back of the resulting tape or sheet when wound on itself.

In the resulting tapes or sheets, the intermediate bonding coat containing rubber compounded with the methylene - bis - (4 - phenyl isocyanate) is bonded strongly to both the vinyl resin backing and the pressure-sensitive adhesive and no separation takes place in use.

While the bonding coat of the character hereinbefore described is particularly useful in securing the bonding of pressure-sensitive adhesives to vinyl resin films or bodies, it is also effective in bonding such pressure-sensitive adhesives to plastic backing films generally, many of which have been found difficult to use with pressure-sensitive adhesives because of nonadherence of the latter. For example, the bonding material as hereinbefore described may be used in effecting the bonding of pressure-sensitive adhesives to films of a rubber hydrohalide, particularly rubber hydrochloride, such as that commercially known as "Pliofilm," films of cellophane or regenerated cellulose, cellulose ester films such as cellulose acetate films, and cellulose ether films such as ethyl cellulose films, for example that known as "Ethofoil" and the like. When prepared with synthetic rubber such as the rubbery butadiene-styrene copolymer, the rubbery butadiene-acrylonitrile copolymers, and chloroprene polymers, the bonding coats are strongly adherent to vinylidene resin films, such as that known as "Saran."

Although the present invention has been described in connection with the specific details of certain embodiments thereof, it is not intended that these shall be regarded as limitations upon the scope of the invention except insofar as included in the accompanying claims.

In the specification and claims, the expressions "a plastic backing film" and "plastic backing films" are intended to be construed as generic to include not only films which consist entirely of a plastic material such as a vinyl resin, rubber hydrochloride, cellulose acetate, ethyl cellulose, etc., but porous paper or fabric sheets which are impregnated with such plastic materials (saturants) to such an extent as to impart to the paper sheets properties comparable to the plastic films. Saturants in amounts of from about 50% upwardly, based on the dry weight of the base sheets, are sufficient to accomplish this.

We claim:

1. Pressure-sensitive adhesive tapes or sheets comprising a flexible backing film consisting mainly of polymerized vinyl chloride, a bonding coat comprising a polymerized diene elastomer and methylene - bis - (4 - phenyl isocyanate) in an amount corresponding to 10 to 30 parts per 100 parts of said elastomer, and a pressure-sensitive adhesive layer comprising rubber and resinous material.

2. Pressure-sensitive adhesive tapes or sheets comprising a backing film consisting mainly of polymerized vinyl chloride, a bonding sheet comprising rubber and methylene - bis - (4 - phenyl isocyanate) in an amount corresponding to 20 parts per 100 parts of said rubber, and a pressure-sensitive film comprising rubber and resinous material.

3. Pressure-sensitive adhesive tapes or sheets comprising a flexible backing film consisting mainly of polymerized vinyl chloride, a bonding coat adherent thereto, said bonding coat comprising a rubber plastic of the diene polymer type and a minor proportion of methylene-bis-(4-phenyl isocyanate), and a pressure-sensitive adhesive film applied to said bonding coat, said pressure-sensitive adhesive film being of the rubber-resin type.

4. Pressure-sensitive adhesive tapes or sheets comprising a backing film consisting mainly of polymerized vinyl chloride, a bonding coat adherent thereto, said bonding coat comprising a rubber plastic of the diene polymer type and 10 to 30% of methylene-bis-(4-phenyl isocyanate), and a pressure-sensitive adhesive film applied to said bonding coat, said pressure-sensitive adhesive film being of the rubber-resin type.

JAMES E. A. HOPKINS.
CARL E. FRICK.
PAUL VAN CLEEF.

REFERENCES CITED

The following references are of record in the file of this patent:

UNITED STATES PATENTS

| Number | Name | Date |
|---|---|---|
| 2,332,265 | Schmidt | Oct. 19, 1943 |
| 2,387,512 | Hilberg | Oct. 23, 1945 |
| 2,415,839 | Neal et al. | Feb. 18, 1947 |
| 2,430,479 | Pratt et al. | Nov. 11, 1947 |
| 2,436,222 | Neal et al. | Feb. 17, 1948 |